(No Model.)  2 Sheets—Sheet 1.

H. E. SWIFT.
PRICE COMPUTING SCALE.

No. 542,969. Patented July 16, 1895.

Witnesses.
Fred S. Greenleaf.
Thomas J. Drummond.

Inventor.
Horace E. Swift.
By Crosby Gregory,
attys.

(No Model.) 2 Sheets—Sheet 2.

H. E. SWIFT.
PRICE COMPUTING SCALE.

No. 542,969. Patented July 16, 1895.

Witnesses.
Fred S. Greenleaf.
Thomas J. Drummond.

Inventor
Horace E. Swift.
By Crosby Gregory
Attys.

UNITED STATES PATENT OFFICE.

HORACE E. SWIFT, OF BOSTON, MASSACHUSETTS, ASSIGNOR TO THE JONES-SWIFT MANUFACTURING COMPANY, OF PORTLAND, MAINE.

PRICE-COMPUTING SCALE.

SPECIFICATION forming part of Letters Patent No. 542,969, dated July 16, 1895.

Application filed March 19, 1895. Serial No. 542,339. (No model.)

*To all whom it may concern:*

Be it known that I, HORACE E. SWIFT, of Boston, county of Suffolk, State of Massachusetts, have invented an Improvement in Price-Computing Scales, of which the following description, in connection with the accompanying drawings, is a specification, like letters on the drawings representing like parts.

This invention has for its object the production of a scale which will accurately and quickly indicate automatically the weight of an article and compute and indicate automatically the aggregate price thereof according to the unit price determined upon.

For every increment in the weight of the article the computing mechanism indicates with absolute accuracy the corresponding increment in price, the movement of the weighing mechanism and the computing mechanism being always positive and exact. The weight of the article is the motive force for the weighing mechanism, and the movement of said mechanism actuates the computing mechanism, the extent of movement of the computing mechanism being determined accurately by the position of the controlling member, manually-operated means fixing the position of said member in accordance with the unit price of the article weighed.

All the moving parts of the apparatus are mounted to move with a minimum of friction, the construction being at once simple, strong, and durable.

In the apparatus herein shown and described the paths of the principal moving parts are in right lines, thus eliminating errors in weighing and computing.

In accordance therewith my invention consists in a computing-scale containing the following instrumentalities, viz: weighing mechanism, price-computing mechanism operatively connected therewith and actuated thereby, a controlling member to determine by its angular position the extent of movement of said computing mechanism, and manually-operated means to fix the angularity of said controlling member, substantially as will be described.

Other features of my invention will be hereinafter described and particularly pointed out in the claims.

Figure 1:
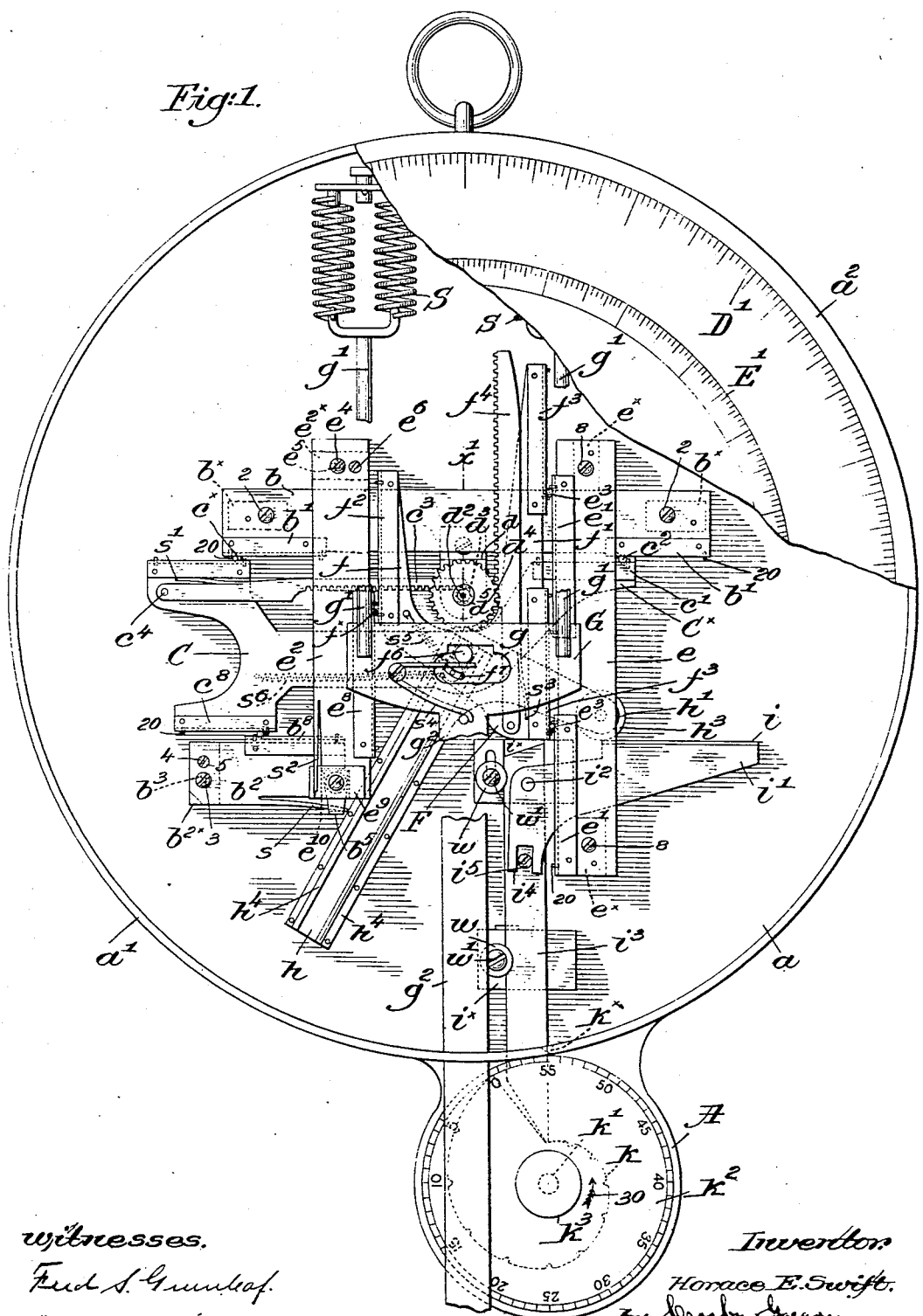
Figure 2:
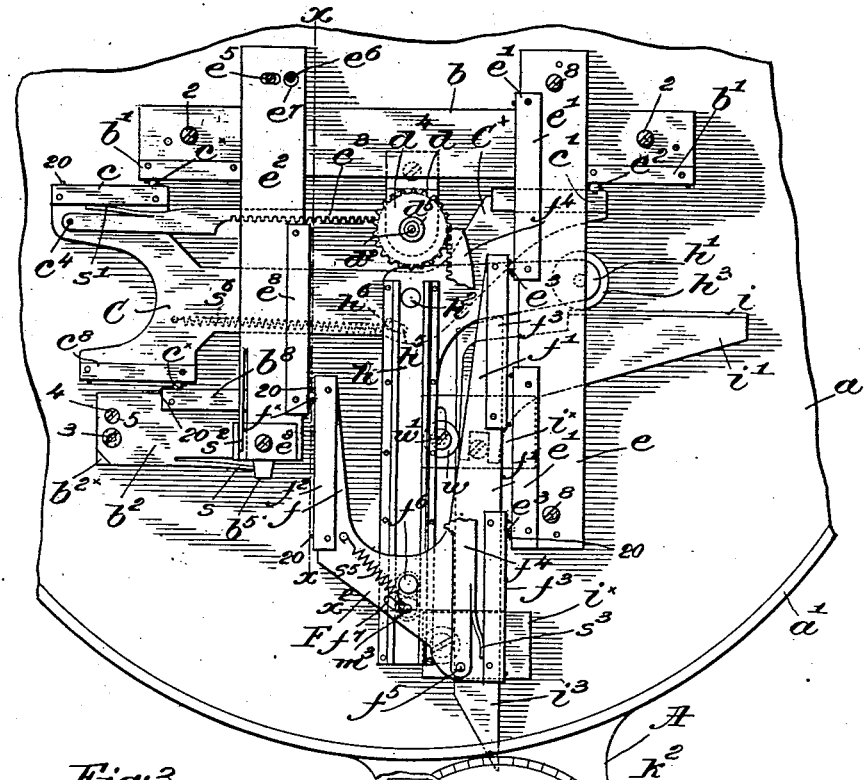
Figure 3:
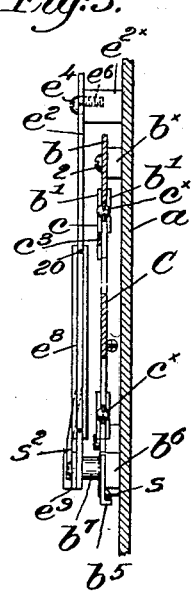
Figure 5:
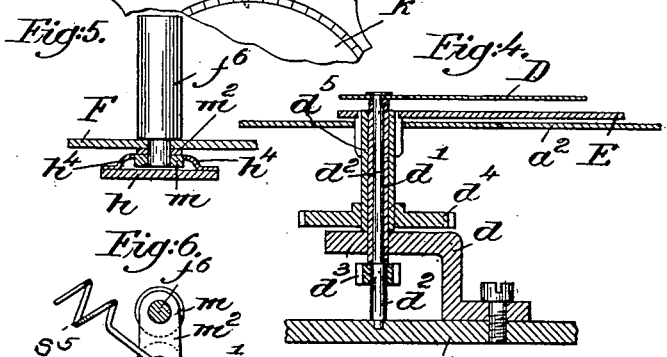
Figure 4:
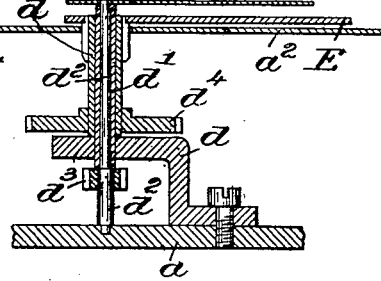
Figure 6:
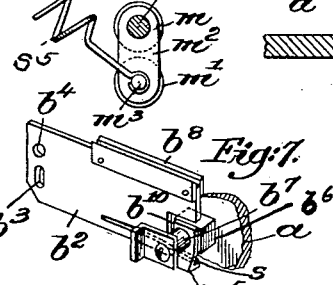
Figure 7:
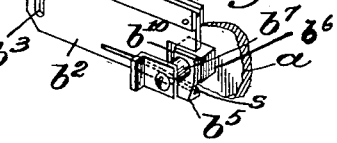

Figure 1 is a front view of a scale embodying my invention, the greater part of the face-plate being broken out to better show the operative parts beneath. Fig. 2 is a similar view with the case partially broken out to save space and with the counterbalancing portion of the weighing mechanism omitted, the remainder of the measuring mechanism and the controlling member being illustrated in a position different from that shown in Fig. 1. Fig. 3 is a sectional view on the line $x\ x$, Fig. 2, looking toward the left. Fig. 4 is an enlarged sectional detail on the line $x'$, Fig. 1. Fig. 5 is an enlarged detail, partly in section, taken on the line $x^2$, Fig. 2. Fig. 6 is a detail, to be described, of one form of connection between the controlling member and the mechanism controlled thereby; and Fig. 7 is a perspective detail of one of the keepers to be described.

Referring to the drawings, I have shown the operative parts of the scale as inclosed in a casing comprising a back $a$, side wall $a'$, and face plate or dial $a^2$, the latter being shown only in Figs. 1 and 4 for the sake of clearness.

A bridge $b$, shown as a flat plate, is mounted upon posts or stands $b^x$ and secured thereto by suitable screws 2, the posts being suitably attached to the back $a$ and so located that the bridge extends across the back above its center. Lips or flanges $b'$ on the lower edge of the bridge, and having preferably beveled edges, (see Fig. 3,) form guides for friction-rolls, to be described, the guides being permanently fixed relative to the back $a$. A second bridge $b^2$ (shown separately in Fig. 7) is mounted on a stand $b^{2x}$ by means of a set-screw 3, passed through a slot $b^3$ in the bridge, and an adjusting-screw 4, whose eccentric head 5 enters a hole $b^4$ in the said bridge, both screws entering the stand $b^{2x}$. By loosening set-screw 3 and rotating the screw 4 its eccentric-head 5 will move the outer end of the bridge $b^2$ toward or away from the bridge $b$. The inner end of the bridge $b^2$ is split to form a spring $s$, which bears against a keeper $b^5$, secured to a stand $b^6$ by a post $b^7$, projecting upwardly therefrom, the spring forcing the inner end of the adjustable bridge $b^2$ toward the fixed bridge $b$. The bridge $b^2$ has a friction-roll guide $b^8$ thereon, similar in construction to those described, and it will be obvious that by rotating the adjusting-screw 4 in the proper direction the said guide $b^3$ may be brought into exact parallelism with the guides on the bridge $b$ and so maintained by the set-screw 3, the two sets of guides lying in the same plane, as shown in Fig. 3.

A traveler, shown as a substantially Y-shaped plate C, has trough-like parallel guides $c$ and $c^x$ fast on its arms to enter between the guide $b^x$ and the like guide at the adjacent end of the bridge $b$, friction-balls $c^x$ held between the contiguous guides, forming therewith ball-bearings for one end of the traveler. The other end of the plate C is bent or upturned at $C^x$, and it has secured thereto a guide $c'$ adjacent and parallel to the guide at the right-hand end of the bridge $b$, forming with a ball $c^2$ another ball-bearing for the traveler, so that the latter is movable back and forth between the bridges $b$ and $b^2$.

A bracket $d$ attached to the back $a$ has secured therein a sleeve-bearing $d'$ perpendicular to and at the center of the back to receive therein a spindle $d^2$, shown in Fig. 4 as stepped in the back $a$ and provided with a pinion $d^3$, the upper end of the spindle projecting beyond the bearing $d'$ to receive a hand or pointer D, adapted to move over and co-operate with a scale D' on the dial $a^2$. The pinion $d^3$ is engaged by the teeth of a rack-bar $c^3$, pivoted at $c^4$ to the traveler C adjacent the guide $c$, as clearly shown in Figs. 1 and 2; and I have herein shown the base of said rack-bar as split to form a spring $s'$, which bears against the guide $c$ between the pivot $c^4$ and the free end of the bar, to thereby maintain its teeth in mesh with the pinion $d^3$.

Movement of the traveler toward the right, Figs. 1 and 2, will through the rack-bar and pinion cause the hand D to move through an arc on the dial proportional to the extent of movement of the traveler, and, as shown herein, the total movement of said traveler will rotate the hand D three times.

A bridge $e$ at right angles to the bridge $b$ is secured by suitable screws 8 to posts or stands $e^x$ on the back $a$ and at the right of the center thereof, as shown in Figs. 1 and 2, and at such a distance therefrom that the traveler C is freely movable beneath it. Guides $e'$ for friction-rolls $e^3$ are formed on the inner edge of the bridge near its ends, as shown.

An adjustable bridge $e^2$ is secured at one end to a stand $e^{2x}$ by a set-screw $e^4$ passed through a slot $e^5$ in the bridge and by an eccentric-headed screw $e^6$ entering a hole $e^7$, the adjustment being effected, as has been described, of the bridge $b^2$ to bring the guide $e^8$ in parallelism with the guides $e'$ on the fixed bridge, said guide $e^8$ being located opposite the adjacent ends of the guides $e'$. The free end of the bridge $e^2$ is split to form a spring $s^2$, which rests against the upturned end of a keeper $e^9$ fast on the post $b^7$, the main part of the split end being sprung under the keeper, (clearly shown in Fig. 3,) so that the spring $s^2$ acts not only to force the end of the bridge inward, but also to grip the keeper $e^9$.

As shown in Fig. 7, the bridge $b^2$ is cut away at $b^{10}$ around the post $b^7$, and the bridge $e^2$ is cut away at $e^{10}$ (see dotted lines, Fig. 1) for a similar purpose, viz: to permit movement of the free end of each adjustable bridge.

A carriage F has two arms $f$ and $f'$ extended between the bridges $e$ and $e^2$ and provided with guides $f^2$ and $f^3$, respectively, the longer arm $f'$ having two such guides thereon to form bearings for the friction rolls or balls $e^3$, while the guide $f^2$ co-operates with the guide $e^8$ and roll $f^x$, so that the carriage F is supported on three ball-bearings and movable toward and from the center of the scale.

In all the guides herein shown the ends of the grooves are closed by pins or projections 20 to keep the balls from escaping at the ends, but other means might be used for the same purpose, as will be obvious.

A rack-bar $f^4$ is pivoted at $f^5$ to the carriage and is split to form a spring $s^3$, which bears against a fixed point on the carriage, herein shown as the adjacent guide $f^3$, between the pivot $f^4$ and the outer toothed end of the rack, to maintain said teeth in engagement with a pinion $d^4$ fast on a sleeve $d^5$ rotatable on the extended bearing $d'$. The sleeve $d^5$ rests on the bracket $d$, and carries at its upper end a hand E to co-operate with the scale E' on the dial $a^2$, said scale being graduated to represent pounds and fractions thereof, the rack and pinion being so constructed that travel of the carriage F from one to the other end of its path will cause the pinion and the hand E to make one complete revolution.

The carriage F has rigidly secured thereto a post or stud $f^6$ to enter an opening $g$ in a yoke-plate G, (shown in Fig. 1,) connected by rods $g'$ to the usual counterbalancing-springs S, suitably attached to the wall $a'$ of the casing, the yoke-plate being reduced in width, as at $g^2$, and extended through an opening in the wall $a'$, to carry at its outer end a hook or other device (not shown) by which the article to be weighed is suspended. Normally the tension of the spring S will draw the yoke into the position shown in Fig. 1, the stud $f^6$ being held against the upper edge of the opening $g$ of the yoke by the free end of a spring $s^4$ mounted on said yoke and permitting the carriage F to return to normal position without a shock if the counterbalancing device is suddenly released.

When an article is attached to the outer end of the bar $g^2$ its weight will draw the yoke and carriage F down against the action of the springs for a distance proportional to the weight of the article, and, as will be understood, the throw of the rack $f^4$ will also vary, causing the pinion $d^4$ and the hand E to be rotated a corresponding amount, whereby the weight is indicated on the scale E' of the dial $a^2$.

The measuring mechanism herein described actuates the computing mechanism, which latter comprises the traveler C, the revoluble hand D, and the rack-and-pinion connection therebetween; but the extent of movement of the computing mechanism is determined by the angular position of a controlling member, by or through which the movement of the measuring mechanism is communicated in a certain ratio to the computing mechanism. Manually-operable means are provided for fixing the angularity of the controlling member in accordance with the unit price of the article to be weighed. As herein shown, the controlling member consists of an L-shaped lever $h\ h'$, pivoted at $h^2$ to the traveler C, in line with the spindle $d^2$ and stud $f^6$, the arm $h'$ carrying a roll $h^3$, adapted to run on a track $i$ on one edge of a plate $i'$, pivoted at $i^2$ to a slide-bar $i^3$, longitudinally movable in grooved bearings $i^x$, and held in place therein by washers $w$ on set-screws $w'$.

The outer end of the slide-bar $i^3$ passes through the casing and into the enlargement A, bearing against the evolute-shaped periphery of a plate $k$, (see dotted lines, Fig. 1,) mounted on a rotatable post $k'$, having fast thereon a dial $k^2$ graduated to indicate the unit price, the dial having sixty divisions, as shown in Fig. 1.

Rotation of the post $k'$ in the direction of the arrow 30 by a thumb-nut $k^3$ will gradually move the slide-bar $i^3$ inward, the position of the plate $i'$ and bar being shown in Fig. 2 when set at zero unit-price and in Fig. 1 when set at the highest unit price possible. Movement of the said plate $i'$ acts upon the roll $h^3$ to turn the controlling member on its pivot $h^2$ and thereby fix its angular position, the said member partaking of the movement of the traveler C from left to right, or vice versa, whatever be the angularity.

An index-point $k^x$ (see dotted lines, Fig. 1) on the dial $a^2$, just above the illustrated position of the zero on the dial-plate $k^2$, directs the operator in giving the proper rotation to the latter to manually fix the angularity of the controlling member in accordance with the unit price of the article.

The long arm $h$ of the controlling member has on its upper side two parallel rails or flanges $h^4$ to form a track, in which move two rolls $m\ m'$, pivotally mounted on the under side of a plate $m^2$, the roll $m$ being mounted on the reduced end of the stud $f^6$, as clearly shown in Fig. 5, and the pivot-pin $m^3$ of the roll $m'$ is extended above the plate $m^2$ and through a curved slot $f^7$ in the plate F.

A spring $s^5$, connected to the pin $m^3$ and the plate F, tends to turn the plate $m^2$ on the stud $f^6$, so that the roll $m$ bears on one rail $h^4$ and the roll $m'$ on the other rail, making an anti-friction connection between the measuring and computing mechanisms.

Referring now to Fig. 2, it will be obvious that when the controlling member $h\ h$ is in the position shown therein movement of the plate F by the measuring mechanism will have no effect upon the traveler C and the computing mechanism will not be operated, inasmuch as the arm $h$ is in the path of movement of the rolls $m\ m'$. Such position of the controlling member corresponds to zero unit price and the scale can be used for weighing without computing. Now, if the controlling member be moved ever so little to change its angularity, the arm $h$ will be moved out of the path of the measuring mechanism and at an angle thereto, and the more the measuring mechanism is moved from its position of "no pounds" shown in Fig. 1 the greater will be the movement of the traveler C to the left, operating the computing mechanisms proportionally.

The greatest angularity of the controlling member is shown in Fig. 1, corresponding to a unit price of 60, in this instance.

When the computing and measuring mechanisms are at zero, the stud $f^6$ and the pivot $h^2$ of the controlling member will be in alignment. A pin $h^5$ (see dotted lines, Fig. 2) on the under side of the arm $h$ is extended through a slot $h^6$ in the traveler C and is connected to the free end of a moderately-strong spring $s^6$, attached to the under side of the traveler, to keep the roll $h^3$ against the track $i$, thus maintaining the controlling member in the angular position determined by the unit price-controlling mechanism.

The plate $i'$ is forked at $i^4$ to receive the eccentric head of a screw $i^5$, whereby rotation of said screw will move the track $i$ to bring it into parallelism with the guide $b'$.

It is of no moment whether the position of the controlling member is fixed according to the unit price of the article before or after the measuring mechanism is operated, as the final position of the computing mechanism will be the same.

By means of the antifriction mounting of the movable parts the operation of the scale is rapid and accurate, and as the movements of the measuring and computing mechanisms are in right lines all error is eliminated.

The scale D' on the dial is shown as divided into quadrants, each quadrant being graduated into one hundred parts, representing cents, so that each quadrant will indicate $1.00 in price, and the scale E' represents pounds and fractions thereof.

Any other suitable graduations may be used, the movement of the co-operating hands or pointers being regulated accordingly.

While the controlling member is herein shown as mounted upon a part of the computing mechanism to move bodily therewith, my invention is not restricted thereto, as said controlling member might be mounted to move with the measuring mechanism, such construction being shown and claimed in another application, Serial No. 542,349, filed concurrently herewith, or the controlling member may be independent of either mechanism, as in my application, Serial No. 529,459, filed the 21st day of November, 1894.

So far as I am aware, it is broadly new to operate the computing mechanism of a scale by movement of the measuring mechanism, the extent of movement of said computing mechanism being controlled by the angular position of a controlling member which is manually operable to fix its angularity in accordance with the unit price, and my invention is not restricted to the construction and arrangement herein shown, as modifications and changes may be made therein without departing from the spirit and scope of the invention.

I claim—

1. A computing scale, containing the following instrumentalities, viz:—weighing mechanism; price computing mechanism operatively connected therewith and actuated thereby; a controlling member to determine by its angular position the extent of movement of said computing mechanism; and manually operated means to fix the angularity of said controlling member, substantially as described.

2. A computing scale, containing the following instrumentalities, viz:—weighing mechanism movable in a right line; price computing mechanism operatively connected to and actuated by the weighing mechanism; a controlling member to determine by its position the extent of movement of said computing mechanism; and manually operated means to fix the position of the controlling member, substantially as described.

3. A computing scale, containing the following instrumentalities, viz:—weighing mechanism movable in a right line; price computing mechanism operatively connected to and actuated by the weighing mechanism; a controlling member to determine by its angular position the extent of movement of said computing mechanism; and means to fix the angularity of the controlling member in accordance with the unit price, substantially as described.

4. A computing scale, containing the following instrumentalities, viz:—weighing mechanism; price computing mechanism operatively connected therewith and actuated thereby; a controlling member to determine by its angular position the extent of movement of said computing mechanism; means to fix the angularity of said controlling member; and visual indicators for and operated respectively by said weighing and computing mechanisms, substantially as described.

5. A computing scale, containing the following instrumentalities, viz:—weighing mechanism; price computing mechanism operatively connected therewith and actuated thereby; a controlling member to determine by its angular position the extent of movement of said computing mechanism; means to fix the angularity of said controlling member; a dial provided with unit and price indicating scales, and co-operating pointers having a relative movement thereover, controlled respectively by the weighing and computing mechanisms, substantially as described.

6. A computing scale, containing the following instrumentalities, viz:—weighing mechanism; price computing mechanism operatively connected therewith and actuated thereby; a controlling member to determine by its angular position the extent of movement of said computing mechanism; and means to alter the angularity of the controlling member; and a locking device to maintain such angular position, substantially as described.

7. A computing scale, containing the following instrumentalities, viz:—weighing mechanism; price computing mechanism, including a rack movable in a right line by operation of the weighing mechanism; a controlling member to determine by its position the extent of movement of said rack; and means to manually fix the position of said controlling member, substantially as described.

8. In a price computing scale the following instrumentalities, viz:—weighing mechanism movable in a right line; price computing mechanism, including a traveler movable at right angles to the path of the measuring mechanism; a controlling member carried by the traveler and movable angularly relative thereto; and connections between said member and the measuring mechanism, whereby the computing mechanism is operated by the measuring mechanism and the extent of its movement determined by the angular position of the controlling member, substantially as described.

9. In a price computing scale the following instrumentalities, viz:—measuring and price computing mechanisms, each including a member movable in a right line, and a rack mounted on each of said members; concentric pinions engaged respectively by said racks, and pointers rotatable by said pinions, combined with a controlling member connecting the said members in the two mechanisms, and means to fix the position of said controlling member, whereby one mechanism is moved by and in a fixed ratio to the movement of the other mechanism, substantially as described.

10. In a price computing scale, weighing and computing mechanisms; a carriage forming a part of one mechanism and a traveler forming a part of the other, movable in paths at right angles to each other; combined with a controlling member pivotally mounted on one, and co-operating friction rolls on the other, to thereby connect the two mechanisms by a movable connection; and means to change the angular position of the controlling member and thereby vary the path of the connection, substantially as described.

11. In a price computing scale, a carriage movable in a right line; and a fixed and an adjustable bridge provided with ball bearings for the carriage; combined with a traveler movable at right angles to the carriage; fixed and adjustable bridges provided with ball bearings for said traveler; a movable connection between the carriage and traveler; and means to change the path of movement of said connection, to thereby vary the ratio of movement of said carriage and traveler, substantially as described.

In testimony whereof I have signed my name to this specification in the presence of two subscribing witnesses.

HORACE E. SWIFT.

Witnesses:
    JOHN C. EDWARDS,
    FREDERICK L. EMERY.